(12) United States Patent
Murtha

(10) Patent No.: US 11,524,831 B2
(45) Date of Patent: Dec. 13, 2022

(54) FOOD PRODUCT ASSEMBLY COMPRISING AN ENCLOSED WIPE

(71) Applicant: Ryan Murtha, Rocky Point, NC (US)

(72) Inventor: Ryan Murtha, Rocky Point, NC (US)

( * ) Notice: Subject to any disclaimer, the term of this patent is extended or adjusted under 35 U.S.C. 154(b) by 316 days.

(21) Appl. No.: 16/859,435

(22) Filed: Apr. 27, 2020

(65) Prior Publication Data
US 2021/0331855 A1 Oct. 28, 2021

(51) Int. Cl.
*B65D 81/36* (2006.01)
*B65D 83/08* (2006.01)
*A23G 3/56* (2006.01)

(52) U.S. Cl.
CPC ........... *B65D 81/365* (2013.01); *A23G 3/563* (2013.01); *B65D 83/08* (2013.01); *B65D 2583/08* (2013.01)

(58) Field of Classification Search
CPC .. B65D 81/365; B65D 83/08; B65D 2583/08; A23G 3/563; A23G 3/56; A23G 9/503
USPC ............................................ 294/5.5; 426/134
See application file for complete search history.

(56) References Cited

U.S. PATENT DOCUMENTS

| | | | | |
|---|---|---|---|---|
| 1,623,926 A | * | 4/1927 | Kohler | A23G 9/503 294/5.5 |
| 2,429,353 A | * | 10/1947 | Gibson, Sr. | A23G 9/506 426/91 |
| 2008/0118613 A1 | * | 5/2008 | Arad | A23G 9/44 426/112 |
| 2015/0060453 A1 | * | 3/2015 | Rahimi | C12G 3/00 220/796 |
| 2016/0029662 A1 | * | 2/2016 | Kivima | A23G 3/563 428/156 |
| 2019/0037879 A1 | * | 2/2019 | Abdelbaky | A23G 9/503 |

FOREIGN PATENT DOCUMENTS

WO    WO 2007/132448 A2 * 11/2007

* cited by examiner

*Primary Examiner* — Lien M Ngo
(74) *Attorney, Agent, or Firm* — Ashley D. Johnson; Dogwood Patent and Trademark Law

(57) ABSTRACT

The presently disclosed subject matter is generally to an assembly comprising a food product with an associated cleaning wipe. Particularly, the disclosed assembly comprises a support used for handling the associated food product. The support includes a handle and an extension that is positioned interior to an associated food product. The handle is hollow and comprises a longitudinal receiving cavity for housing a cleaning wipe. The wipe can be accessed through the removal of a closure from one end of the handle. In this way, after the food product has been consumed, the cleaning wipe can be accessed and used the clean the face and/or hands of the user.

20 Claims, 11 Drawing Sheets

FOOD PRODUCT ASSEMBLY COMPRISING AN ENCLOSED WIPE

TECHNICAL FIELD

The presently disclosed subject matter relates to the food industry and more particularly to food product assemblies that include a handle with an enclosed cleaning wipe.

BACKGROUND

Keeping one's hands and face clean while eating messy food can be a difficult and frustrating experience. Children especially have a difficult time eating lollipops, ice cream, etc. without getting their face and hands sticky or dirty. Traditionally, bibs or napkins have been used to protect the wearer from drips and spills while eating problematic foods. However, many users (especially children) find bibs uncomfortable. Further, bibs can easily be removed by a child reaching around the back of their neck. When a person's hands and face are dirty, the food can easily be transferred to the clothing and immediate surroundings (furniture, car, etc.). The clothing and surroundings must then be cleaned, which is a time-consuming and not always successful process. It would therefore be beneficial to provide a product that can be easily and comfortably used to remove food from the face and hands of a user. It would further be beneficial if the product was manufactured as part of the food item, allowing for cleaning on the go or when in public.

SUMMARY

In some embodiments, the presently disclosed subject matter is directed to a food product assembly. Particularly, the food product assembly comprises a support defined by a handle and an extension. The handle comprises opposed first and second ends and an interior cavity operably connected to the second end. The extension is positioned at the first end of the handle and extends outwardly therefrom. The assembly includes one or more wipes housed within the handle interior cavity. The assembly further includes a removable closure positioned at the handle second end, wherein when the closure is removed, the handle cavity is accessible and/or the one or more wipes are accessible. The food product assembly further includes a food product positioned such that the extension is housed within an interior of the food product and the handle is exposed for gripping by the user. The one or more wipes are available for removal from the second end of the handle after the closure is removed.

In some embodiments, the handle first end is an open end and the second end is a closed end. In some embodiments, both the handle first and seconds ends are open ends. In some embodiments, both the first and second ends are closed ends. The term "open end" refers to an end that is open to the exterior environment (e.g., such as to remove an interior wipe from the handle cavity). The term "closed end" refers to an end that is closed to the exterior environment.

In some embodiments, the handle and extension are about parallel relative to each other.

In some embodiments, the handle, extension, closure, one or more wipes, or combinations thereof are biodegradable.

In some embodiments, the closure is attached to the one or more wipes.

In some embodiments, the cavity spans the full length of the handle, and further comprises a second closure positioned at the first end of the handle.

In some embodiments, the closure comprises a tapered end.

In some embodiments, the one or more wipes are pre-moistened.

In some embodiments, the one or more wipes are rolled or folded within the handle cavity.

In some embodiments, the extension passes through a center of the food product.

In some embodiments, the extension has a length and width that are 5-50 percent less than the length and width of the handle.

In some embodiments, the presently disclosed subject matter is directed to a method of using a food product assembly. The food product assembly comprises a support defined by a handle and an extension. The handle comprises opposed first and second ends and an interior cavity operably connected to the second end. The extension is positioned at the first end of the handle and extends outwardly therefrom. The assembly includes one or more wipes housed within the handle interior cavity. The assembly further includes a removable closure positioned at the handle second end, wherein when the closure is removed, the handle cavity is accessible and/or the one or more wipes are accessible. The food product assembly further includes a food product positioned such that the extension is housed within an interior of the food product and the handle is exposed for gripping by the user. The one or more wipes are available for removal from the second end of the handle after the closure is removed. The method comprises removing the closure from the handle second end of a food product assembly. One or more wipes are then removed from the handle cavity. The one or more wipes are then used as needed before, during, or after the food product has been consumed.

In some embodiments, the closure is removed manually or mechanically by applying a pulling action.

In some embodiments, the closure is attached to the one or more wipes, such that when the closure is removed from the handle second end the one or more wipes are also removed from the handle cavity.

In some embodiments, the handle, extension, closure, one or more wipes, or combinations thereof are biodegradable.

In some embodiments, the cavity spans the full length of the handle, and further comprises a second closure positioned at the first end of the handle.

In some embodiments, the cavity spans less than the full length of the handle.

In some embodiments, the closure comprises a tapered end.

In some embodiments, the one or more wipes are pre-moistened.

In some embodiments, the one or more wipes are rolled or folded within the handle cavity.

In some embodiments, the extension passes through a center of the food product.

DETAILED DESCRIPTION

Figure 1:
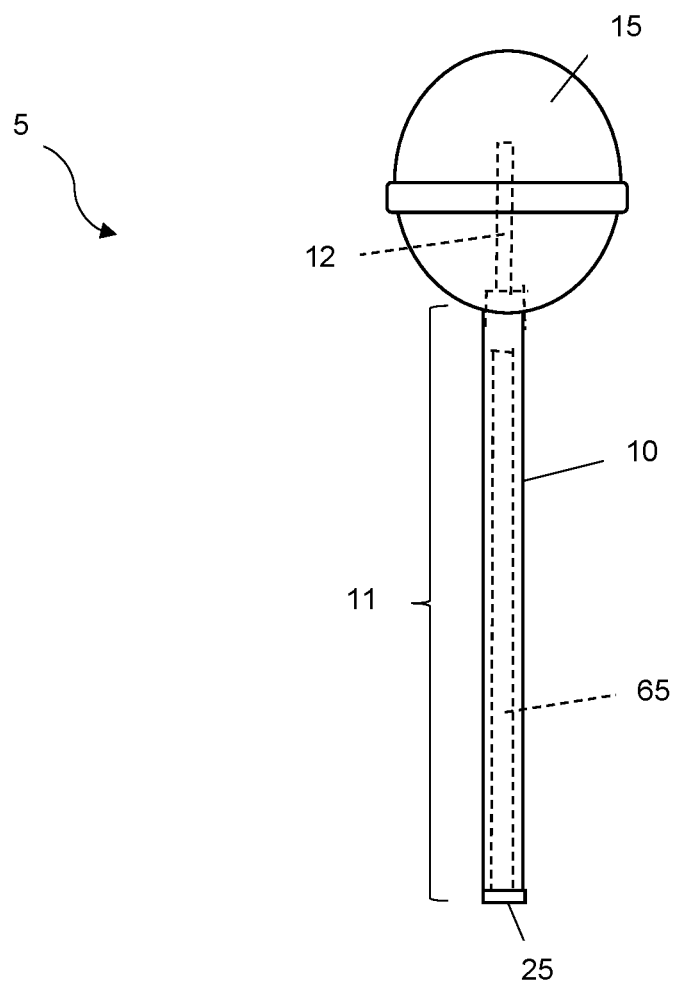
FIG. 1 is a front plan view of an assembly in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed a food product assembly with an associated cleaning wipe. As shown in FIG. 1, assembly 5 comprises support 10 used for handling and reinforcing food product 15. The support includes handle 11 used to grip the assembly, and extension 12 positioned interior to the food product. The handle is hollow and comprises a longitudinal receiving cavity for housing wipe 65. The wipe can be accessed using any known mechanism, such as the removal of a closure (e.g., plug 25) from one end of the handle. In this way, after or during consumption of the food product, the cleaning wipe can be accessed and used the clean the face and/or hands of the user. The term "food product" as used herein can include any food that can be used with a corresponding stick or handle. For example, suitable food products can include (but are not limited to) lollipops, ice cream bars, popsicles, candy apples, cotton candy, push up ice cream bars, cake pops, corn dogs, or any other food that can be deposited on one end of a handle (e.g., chicken fingers, vegetables, steak kabobs), and the like.

Figure 2:
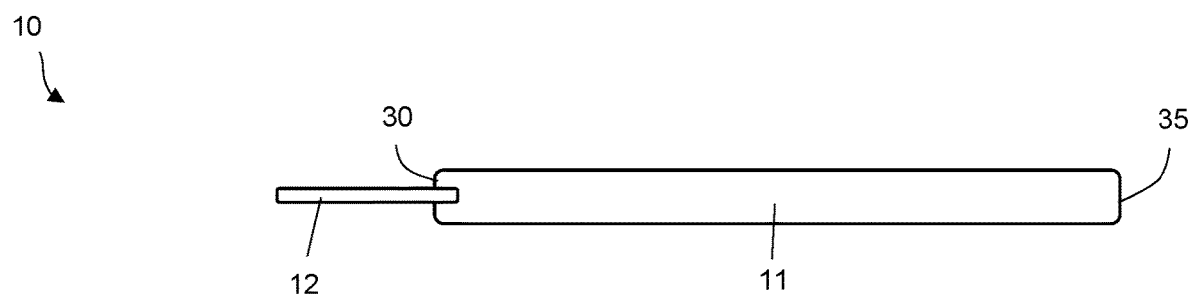
FIG. 2 is a side plan view of an assembly support in accordance with some embodiments of the presently disclosed subject matter.
Figure 3A:
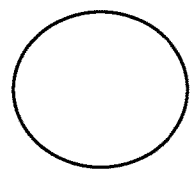
FIGS. 3a-3i are cross-sectional views of various supports in accordance with some embodiments of the presently disclosed subject matter.
Figure 3B:
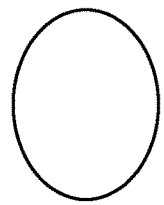
Figure 3C:
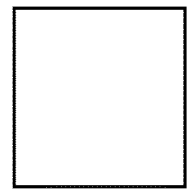
Figure 3D:
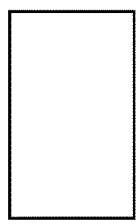
Figure 3E:
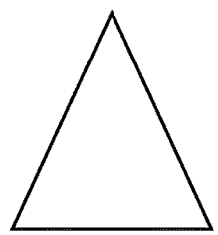
Figure 3F:
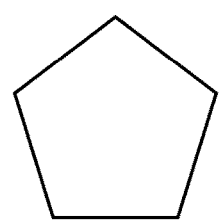
Figure 3G:
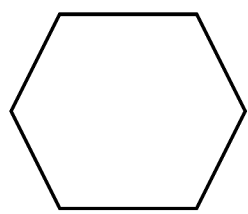
Figure 3H:
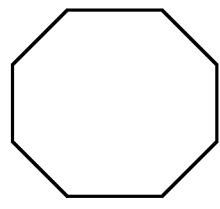
Figure 3I:
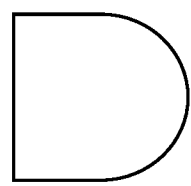

FIG. 2 illustrates one embodiment of support 10 comprising handle 11 and extension 12. The term "handle" as used herein refers to any element by which a user would typically grasp or hold a product. The term "extension" refers to any protrusion that directly supports and/or is housed within at least a portion of a corresponding food product. As shown, handle 11 includes first end 30 and opposed second end 35. Extension 12 is positioned at handle first end 30 and extends into an associated food product, such as through the center of a lollipop. The extension is therefore in direct contact with food product 15. In some embodiments, at least a portion of handle first end 30 can be housed within the food product.

In some embodiments, the extension and handle are formed as a single unit. In other embodiments, the handle and extension are separately formed but are attached together using any known mechanism (e.g., adhesive, snap fit connection, screw fit connection). As shown in FIG. 2, in some embodiments, extension 12 extends at least partially into the interior of handle 11. However, in other embodiments, the extension is flush with handle first end 30 and does not extend into the handle interior.

In some embodiments, handle 11 and extension 12 can be parallel or about parallel in construction (e.g., extend in the same direction and/or have a common line). However, the extension can be angled relative to the handle in some embodiments.

Handle 11 and extension 12 can be constructed from any desired rigid, semi-rigid, or pliable material. The term "rigid" refers to a material that has a high stiffness or modulus of elasticity (e.g., greater than $0.5 \times 10^6$ psi). The term "semi-rigid" refers to a material that holds a shape without external support, but exhibits higher flexibility when external forces are exerted on the structure compared to a rigid material. The term "pliable" refers to a material that does not hold a shape without external support, and exhibits higher flexibility compared to a semi-rigid material. Suitable handle and/or extension materials can therefore include (but are not limited to) wood, metal, polymeric material, paper (e.g., cardboard, compressed paper), or combinations thereof.

In some embodiments, one or more materials used to construct support 10 can be biodegradable. The term "biodegradable" refers to materials that can be readily decomposed by biological methods, such as heat, moisture, and/or bacterial action. In some embodiments, support 10 is about 50, 60, 70, 80, 90, or 100 percent biodegradable.

In some embodiments, the materials used to construct handle 11 are the same as those materials used to construct extension 12. However, the presently disclosed subject matter is not limited and the handle and extension can be constructed from different materials.

Handle 11 and extension 12 can have any desired cross-sectional shape. For example, in some embodiments, the elements can have a round, oval, square, rectangular, triangular, pentagonal, hexagonal, octagonal, or abstract shape, as illustrated in FIGS. 3a-3i. It should be appreciated that the cross-sectional shape of the handle and/or extension is not limited and can have any desired shape. It should further be appreciated that the handle and extension can have the same cross-sectional shape or differing cross-sectional shapes.

Further, the handle and extension can have any desired overall shape, such as (but not limited to) a cylindrical shape. However, the presently disclosed subject matter is not limited and one or more elements of the support can have a differing shape. For example, the handle can have a customized shape, such as a cartoon character, an animal, a flower, etc.

Figure 4A:
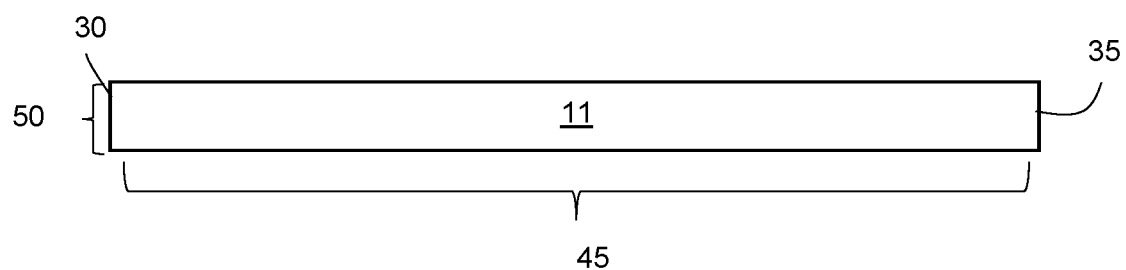
FIG. 4a is a side plan view of an assembly handle in accordance with some embodiments of the presently disclosed subject matter.
Figure 4B:
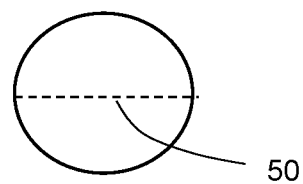
FIG. 4b is a cross-sectional view of an assembly handle in accordance with some embodiments of the presently disclosed subject matter.
Figure 4C:
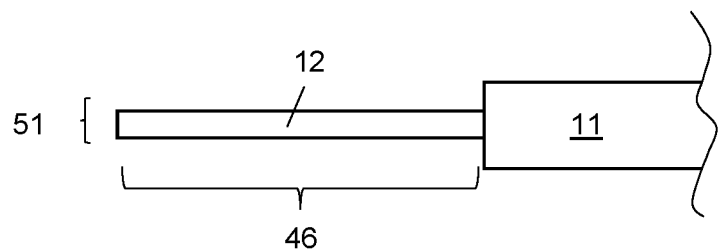
FIG. 4c is a side plan view of an assembly extension in accordance with some embodiments of the presently disclosed subject matter.

The handle can have any desired length and width, so long as it allows a user to effectively grasp assembly 5. FIG. 4a illustrates one embodiment of handle 11 comprising length 45 and width 50. The term "length" refers to the longest dimension in the longitudinal direction (e.g., from first end 30 to second end 35). The term "width" refers to the distance of a straight-line segment passing through the center of a face, as shown in FIG. 4b. Similarly, extension 12 can have any desired length 46 and width 51, as illustrated in FIG. 4c.

In some embodiments, handle 11 and/or extension 12 can have a length of about 0.5-10 inches (e.g., at least/no more than about 0.5, 1, 1.5, 2, 2.5, 3, 3.5, 4, 4.5, 5, 5.5, 6, 6.5, 7, 7.5, 8, 8.5, 9, 9.5, or 10 inches). However, it should be appreciated that the handle and extension can have lengths longer or shorter than the range given above. In some embodiments, the length of the extension is shorter than the length of the handle. However, the presently disclosed subject matter is not limited and the extension can have a length that is greater than or about equal to the length of the handle. For example, the extension have a length that is about 5-95 percent longer or shorter than the length of the handle (e.g., at least/no more than about 5, 10, 15, 20, 25, 30, 35, 40, 45, 50, 55, 60, 65, 70, 75, 80, 85, 90, or 95 percent).

In some embodiments, the handle and/or extension can have a width of about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). It should be appreciated that handle 11 and/or extension 12 can have a width greater or less than the range given above. In some embodiments, the width of extension 12 is less than the width of handle 11. However, the presently disclosed subject matter is not limited and includes embodiments wherein the width of extension 12 is greater than or about equal to the width of handle 11. For example, the extension have a width that is about 5-95 percent greater or less than the width of the handle (e.g., at least/no more than about 5, 10, 15, 20, 25, 30, 35, 40, 45, 50, 55, 60, 65, 70, 75, 80, 85, 90, or 95 percent).

The exterior surface of support 10 can have any desired visual appearance. For example, the handle and/or extension can be configured in any desired color and/or pattern. The handle and extension can include the same or differing colors and/or patterns as desired.

Extension 12 can be hollow in some embodiments to increase the lightweight quality of assembly 5. However, the extension can be solid in some embodiments to provide added support for food product 15.

Figure 5A:
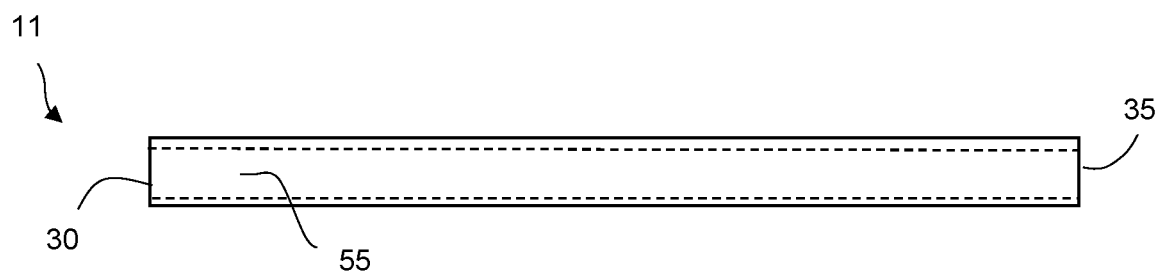
FIGS. 5a and 5b are side plan views of an assembly handle in accordance with some embodiments of the presently disclosed subject matter.
Figure 5B:
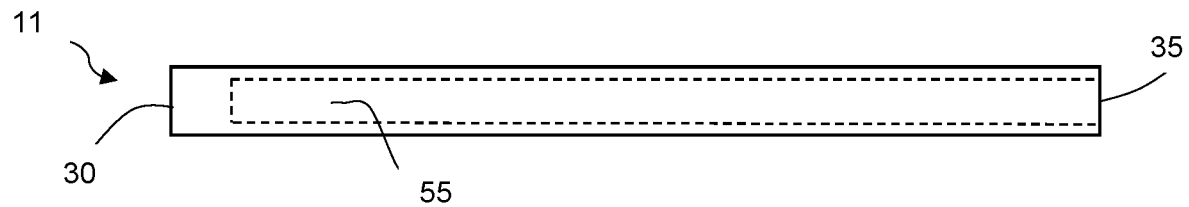

Handle 11 is hollow to allow insertion of one or more cleaning wipes. The term "hollow" refers to a void area or cavity positioned within the interior of the handle. In some embodiments, internal handle cavity 55 runs the full length of the handle, as shown in FIG. 5a. In other embodiments, the internal handle cavity runs about 10-99 percent of the full length of the handle, as illustrated in FIG. 5b. The cavity can therefore span at least/no more than about 10, 15, 20, 25, 30, 35, 40, 45, 50, 55, 60, 65, 70, 75, 80, 85, 90, 95, 99, or 100 percent of the length of the handle.

Figure 6A:
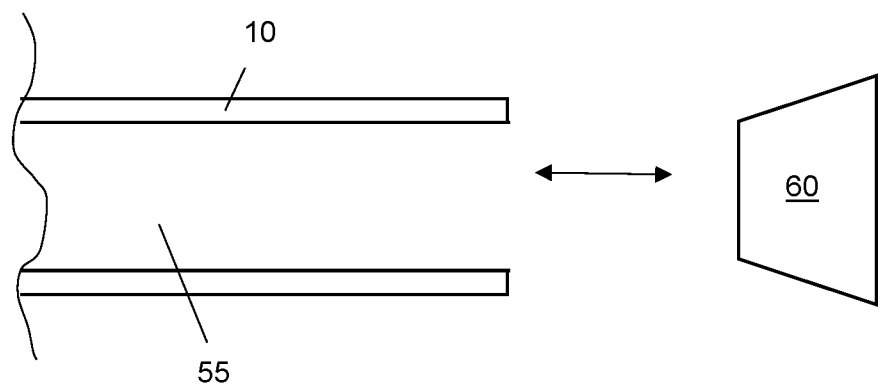
FIGS. 6a-6b are side plan views of a method of adding a closure to an assembly handle in accordance with some embodiments of the presently disclosed subject matter.
Figure 6B:
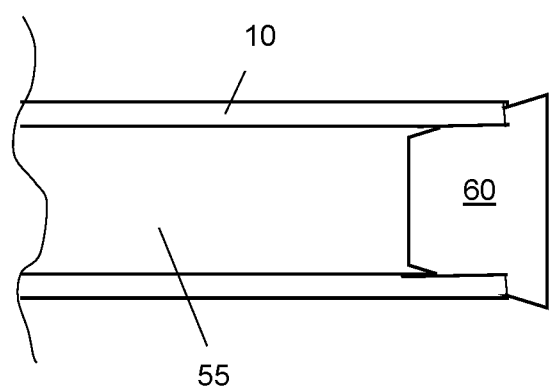

Handle cavity 55 includes at least one open end to allow the contents of the cavity to be inserted and/or removed. For example, handle second end 30 can be an open end, cooperating with closure 60 to insert and/or remove one or more cleaning wipes. In these embodiments, first end 30 can be a closed end or an open end. The term "open end" refers to an end that is in direct contact with the outside environment and can be sealed from the outside environment with a closure. The term "closed end" refers to an end that is closed off from the outside environment. Closure 60 can include any element that seals an end of the handle. For example, the closure can include a plug, end cap, fitting, insert, and the like. In some embodiments, the closure can include at least one tapered end to facilitate insertion into cavity 55. FIGS. 6a and 6b illustrate closure 60 cooperating with second handle end 35 to open and close the cavity.

The closure can be constructed from any desired material, such as (but not limited to) rubber, polymeric material, foam, wood, paper, cardboard, metal, or combinations thereof.

Figure 6C:
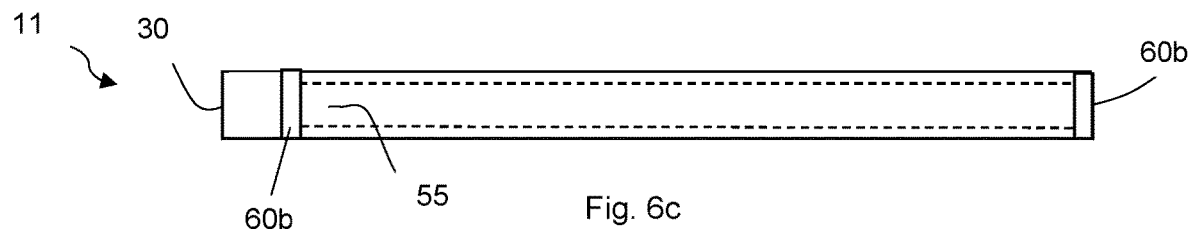
FIG. 6c is a side plan view of an assembly handle in accordance with some embodiments of the presently disclosed subject matter.

In some embodiments, a second closure can positioned at or near first end 30 of handle 11. For example, as shown in FIG. 6c, cavity 55 can be bound on either side by first and second closures 60a, 60b. The second closure helps to ensure that the cavity remains sealed from the outside environment.

Figure 7A:
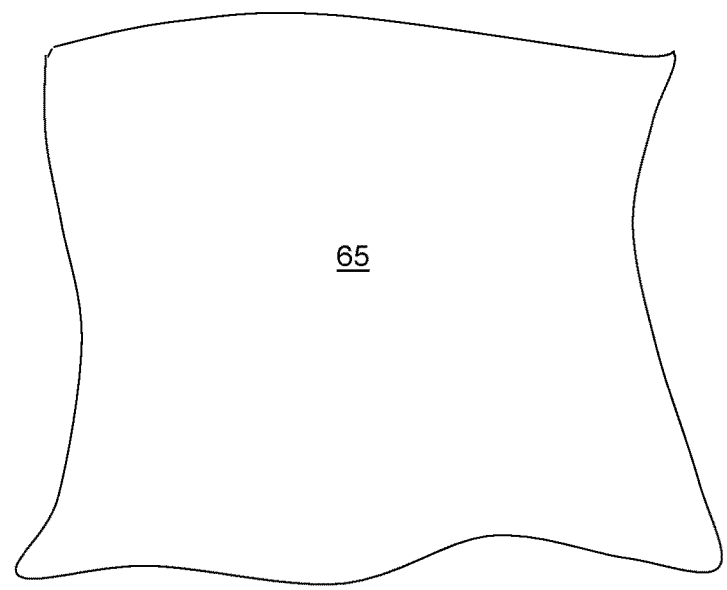
FIG. 7a is a top plan view of an assembly wipe in accordance with some embodiments of the presently disclosed subject matter.

Cavity 55 can include any of a wide variety of cleaning items, such as (but not limited to) a wipe. In some embodiments, the wipe can be pre-moistened for easier removal of food from the hands and face. Thus, handle cavity 55 can be moisture-impervious to ensure that the wipe remains moistened until used. One embodiment of representative wipe 65 is shown in FIG. 7a. In some embodiments, the wipe can be rolled, folded, or otherwise reconfigured to fit within handle cavity 55. It should be appreciated that the outer diameter of the folded wipe is less than the diameter of handle cavity 55 to allow the wipe to housed therein. For example, the outer diameter of the folded wipe can be at least about 1, 5, 10, 15, 20, 25, 30, 35, 40, 45, 50 smaller than the cavity diameter.

Wipe 65 can be constructed from any desired material, such as (but not limited to) paper, rayon, viscose, lyocell, pulp, cotton, wool, silk, jute, linen, ramie, hemp, flax, polypropylene, polyethylene, polyamide, polyester, or combinations thereof. In some embodiments, the wipe can be soft, cloth-like, and/or flexible. In some embodiments, wipe 65 can be constructed from one or more biodegradable materials. In some embodiments, wipe 65 is about 50-100% biodegradable (e.g., 50, 60, 70, 80, 90, or 100 percent).

Figure 7B:
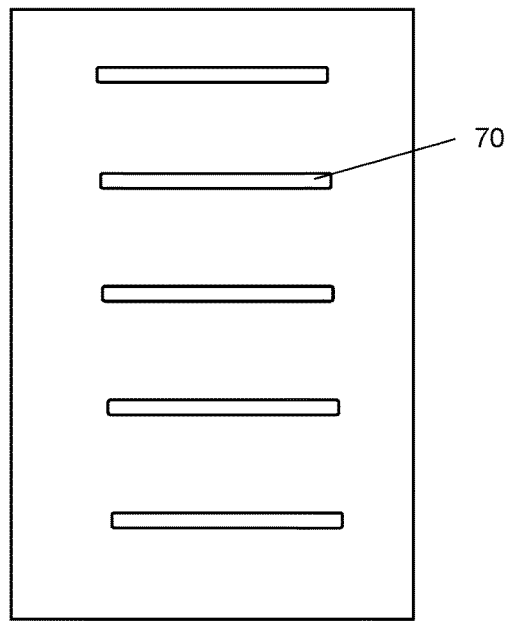
FIG. 7b is a top plan view of an assembly wipe comprising textured regions in accordance with some embodiments of the presently disclosed subject matter.

Optionally, the disclosed wipe can have one or more textured regions for increased removal of food from the user's hands and face. Such textured regions can include raised or depressed regions along one or more surfaces of wipe 65. FIG. 7b illustrates one embodiment of a wipe comprises textured regions 70. However, it should be appreciated that the textured regions can have any desired shape or configuration.

The disclosed wipe can have any desired shape, such as square, rectangular, oval, and the like. Similarly, the wipe can be configured in any desired size (e.g., 4×6 inches), so long as it fits within cavity 55. In some embodiments, more than one wipe can be housed within the handle cavity.

In some embodiments, wipe 65 can be pre-moistened using any desired liquid or gel. For example, suitable moistening agents can include (but are not limited to) tap water, distilled water, saline, deionized water, buffered salt solution, or combinations thereof.

The wipe can optionally include one or more additives. The term "additive" refers to any material that can be added to provide one or more desirable characteristics. Suitable additives can therefore include one or more surfactants (amphoteric imidazoline derivatives, fatty sulfosuccinate esters and amides, ethoxylated sorbitan esters, alkylamido alkylamines, betaines, alkoxylated alcohols, phosphorus derivatives, quaternary ammonium compounds, ethoxylated alkylphenols, alkyl ether sulfates, etc.), buffering agents (citric acid, disodium phosphate, lactic acid, phosphoric acid, potassium phosphate, etc.), skin care additives (vitamin E, provitamin B5, aloe vera, chamomile, polysorbate 20, lanolin, polyols, silicones, esters, etc.), scents (lavender, vanilla, etc.) and the like to improve the wipe's shelf life, texture, aroma, moisturizing properties, and/or antioxidant properties. The additives can be present in an amount of about 0.01-10 weight percent, based on the total weight of the liquid used to moisten the wipe.

In some embodiments, the wipe is releasably or permanently attached to closure 60. In this way, when the closure is removed from the handle, the wipe is automatically pulled from the interior of the handle. The wipe can be releasably attached to the closure using any known method, such as (but not limited to) the use of one or more adhesives.

Figure 8A:
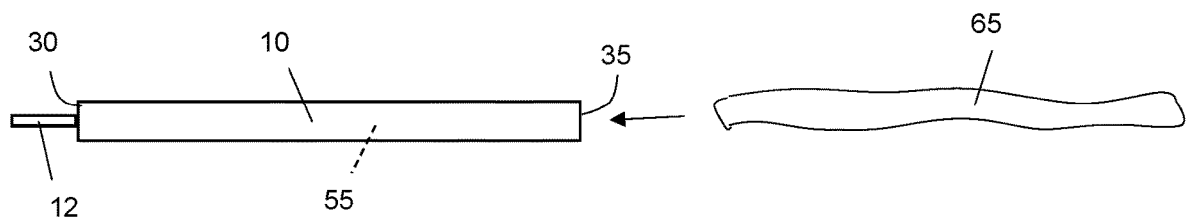
FIGS. 8a-8e are side plan views of a method of constructing a food product assembly in accordance with some embodiments of the presently disclosed subject matter.
Figure 8B:
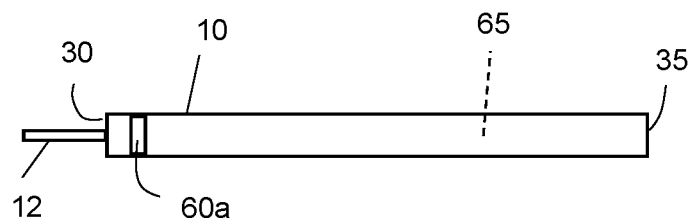
Figure 8C:
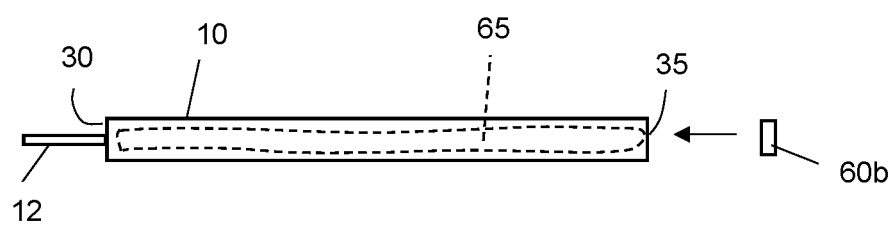
Figure 8D:
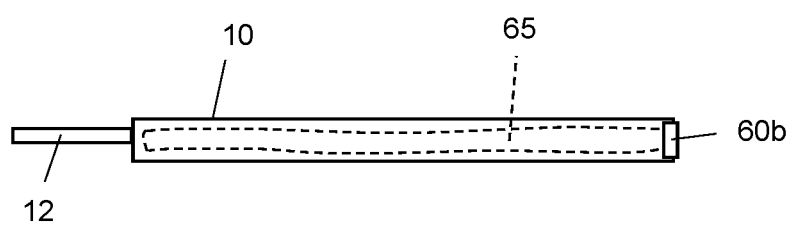
Figure 8E:
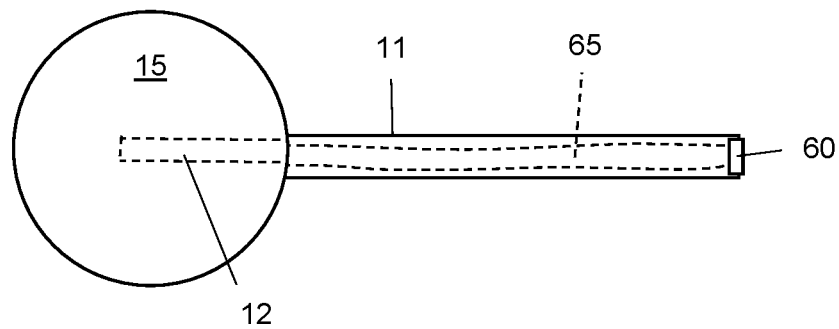

To produce edible product 5, one or more wipes 65 can be folded or otherwise reduced in size to fit inside handle cavity 55, as shown in FIG. 8a. Specifically, the wipe can be manually or mechanically inserted into the cavity through handle second end 35. In some embodiments, cavity 55 can be configured to include first closure 60a prior to insertion of the wipe, as illustrated in FIG. 8b. After the wipe has been inserted into the interior of the cavity, closure 60b is then positioned on second end 35 to reliably contain the wipe within the cavity, as shown in FIGS. 8c and 8d. Extension 12 is then received into the interior of food product 15, as shown in FIG. 8e.

Support 10 can be pre-assembled such that the handle and extension are attached together prior to insertion of wipe 65. However, in some embodiments, the handle and extension are separately formed and are connected during assembly, such as through the use of adhesive, lock-fit connection, screw fit connection, and the like.

Extension 12 can extend into the food product a distance of about 5-95 percent of the diameter of the food product to provide a strong connection. Thus, the extension can span a distance of about 5, 10, 15, 20, 25, 30, 35, 40, 45, 50, 55, 60, 65, 70, 75, 80, 85, 90, or 95 percent of the total length of the food product. In some embodiments, extension 12 is positioned through the center of the food product. For example, if the length or diameter of food product 15 is 1 inch, the extension can extend about 0.05 inches (5 percent) to 0.95 inches (95%) through the length or diameter of the food product.

It should be appreciated that steps given above can be accomplished in any order (e.g., the extension can be inserted into the food product prior to housing the wipe within the handle interior).

Figure 9A:
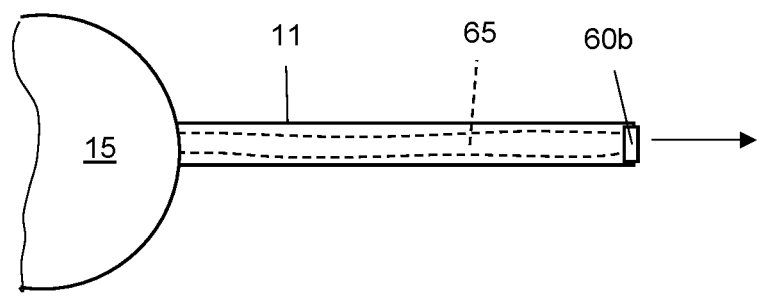
FIGS. 9a-9d are side plan views of a method of using the assembly in accordance with some embodiments of the presently disclosed subject matter.
Figure 9B:
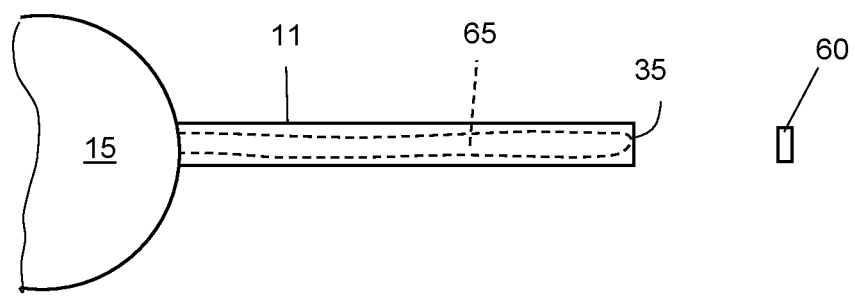
Figure 9C:
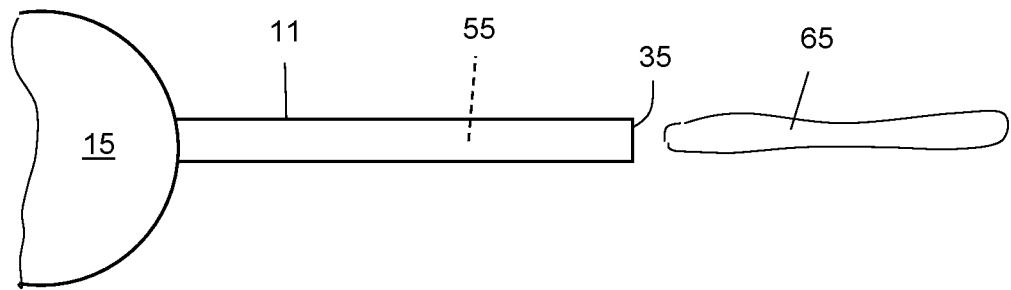
Figure 9D:
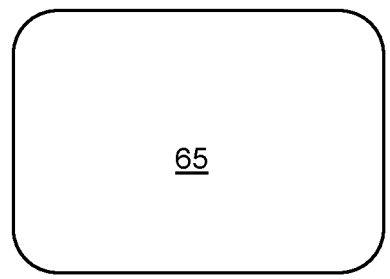
Figure 10A:
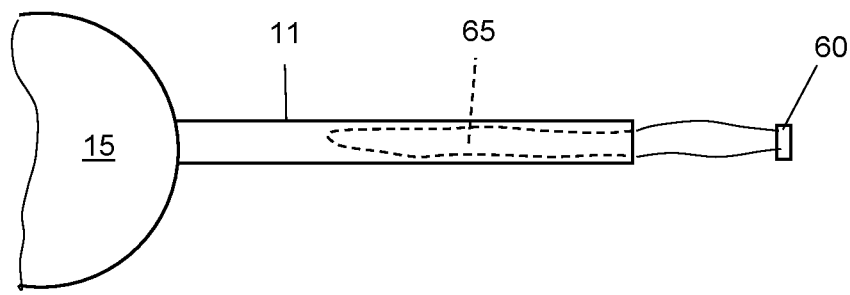
FIGS. 10a-10c are side plan views of a method of using the assembly in accordance with some embodiments of the presently disclosed subject matter.
Figure 10B:
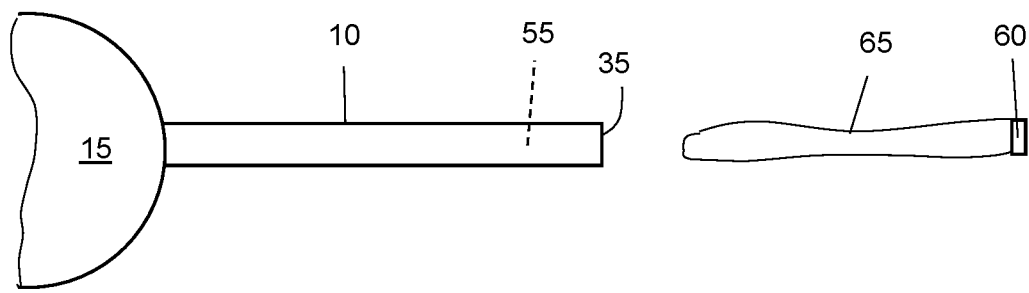
Figure 10C:
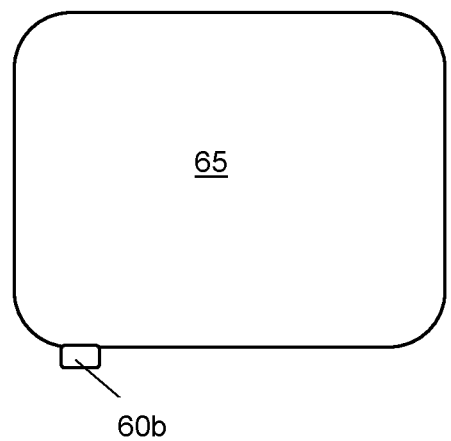

FIGS. 9a-9d illustrate one embodiment of using the disclosed food product 5. As shown in FIG. 9a, when a user has eaten all or a portion of food product 15 (or at any desired time), closure 60b can be removed by a user. In some embodiments, a light pressure can be applied to the closure. Open end 35 of the handle can then be accessed to remove wipe 65, as shown in FIGS. 9b and 9c. The wipe can then be unrolled and/or unfolded and used to clean a user's hands and/or face as desired, as shown in FIG. 9d. In some embodiments, the wipe is releasably attached to closure 60, such that when the closure is removed, the wipe is pulled from cavity 55, as shown in FIGS. 10a-10c. The wipe can then be used for any desired purpose, such as to remove food product 15 from a user (or child's) face, hands, and/or surrounding environment (e.g., toys, furniture). After use, the wipe, handle, closure and/or edible product can then be discarded.

The presently disclosed subject matter offers many advantages over prior art edible products. The disclosed food product allows for quick and easy cleanup of the user's hand and/or face after eating a sticky or messy food product. In this way, the portion of the food deposited on the hands and/or face is removed promptly, before it is tracked to other items (the car, furniture, clothing, etc.).

Further, assembly 5 can be easily used and requires little to no training.

The disclosed assembly is also convenient, allowing access to wipe 65 as soon as needed by the user. The user is not required to track down cleaning materials because they are provided within handle 11.

It will be apparent that while a preferred embodiment of the presently disclosed subject matter has been shown and described, various modifications can be made without departing from the true spirit and scope of the invention.

What is claimed is:

1. A food product assembly comprising:
    a support defined by:
    a handle comprising opposed first and second ends and an interior cavity operably connected to the second end; and
    an extension positioned at the first end of the handle and extending outwardly therefrom, wherein the extension further extends into an interior of the handle at the first handle end;
    one or more wipes housed within the interior cavity;
    a removable closure positioned at the handle second end, wherein when the closure is removed from the assembly, the handle cavity is accessible; and
    a food product positioned such that the extension and first end of the handle are housed within an interior of the food product and the second end of the handle is exposed for gripping by the user;
    wherein the one or more wipes are available for removal from the second end of the handle after the closure is removed.

2. The food product assembly of claim 1, wherein the handle and extension are about parallel relative to each other.

3. The food product assembly of claim 1, wherein the handle, extension, closure, one or more wipes, or combinations thereof are biodegradable.

4. The food product assembly of claim 1, wherein the closure is attached to the one or more wipes.

5. The food product assembly of claim 1, wherein the cavity spans the full length of the handle, and further comprises a second closure positioned at the first end of the handle.

6. The food product assembly of claim 1, wherein the closure comprises a tapered end.

7. The food product assembly of claim 1, wherein the one or more wipes are pre-moistened.

8. The food product assembly of claim 1, wherein the one or more wipes are rolled or folded within the handle cavity.

9. The food product assembly of claim 1, wherein the extension passes through a center of the food product.

10. The food product assembly of claim 1, wherein the extension has a length and width that are 5-50 percent less than the length and width of the handle.

11. A method of using a food product assembly, the method comprising:
    removing the closure from the handle second end of the food product assembly of claim 1;
    removing the one or more wipes from the handle cavity; and
    using the one or more wipes as needed before, during, or after the food product has been consumed.

12. The method of claim 11, wherein the closure is removed manually or mechanically by applying a pulling action.

13. The method of claim 11, wherein the closure is attached to the one or more wipes, such that when the closure is removed from the handle second end the one or more wipes are also removed from the handle cavity.

14. The method of claim 11, wherein the handle, extension, closure, one or more wipes, or combinations thereof are biodegradable.

15. The method of claim 11, wherein the cavity spans the full length of the handle, and further comprises a second closure positioned at the first end of the handle.

16. The method of claim 11, wherein the cavity spans less than the full length of the handle.

17. The method of claim 11, wherein the closure comprises a tapered end.

18. The method of claim 11, wherein the one or more wipes are pre-moistened.

19. The method of claim 11, wherein the one or more wipes are rolled or folded within the handle cavity.

20. The method of claim 11, wherein the extension passes through a center of the food product.

* * * * *